United States Patent
Jaeger et al.

(10) Patent No.: US 6,582,263 B1
(45) Date of Patent: Jun. 24, 2003

(54) MARINE EXHAUST ELBOW STRUCTURE WITH ENHANCED WATER DRAIN CAPABILITY

(75) Inventors: Matthew W. Jaeger, Stillwater, OK (US); Cindy J. Minor, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/124,562

(22) Filed: Apr. 17, 2002

(51) Int. Cl.[7] .............................. B63H 21/38
(52) U.S. Cl. .................. 440/89 C; 60/320; 60/321; 440/88 J
(58) Field of Search ............... 440/89, 88 J, 89 C; 60/320, 321

(56) References Cited

U.S. PATENT DOCUMENTS

| | | | |
|---|---|---|---|
| 3,696,620 A | * 10/1972 | Pace | 60/321 |
| 4,504,238 A | * 3/1985 | Neisen | 440/89 |
| 4,573,318 A | 3/1986 | Entringer et al. | 60/310 |
| 4,845,945 A | 7/1989 | Widmer et al. | 60/310 |
| 4,866,934 A | 9/1989 | Lindstedt | 60/321 |
| 4,969,504 A | * 11/1990 | Ruhnke et al. | 164/235 |
| 4,977,741 A | 12/1990 | Lulloff et al. | 60/310 |
| 4,991,546 A | 2/1991 | Yoshimura | 123/41 |
| 5,018,568 A | 5/1991 | VanRens | 164/34 |
| 5,109,668 A | 5/1992 | Lindstedt | 60/310 |
| 5,174,252 A | 12/1992 | Binversie et al. | 123/65 |
| 5,653,117 A | * 8/1997 | Kujak | 62/112 |
| 5,910,095 A | 6/1999 | Strasser et al. | 60/272 |
| 6,022,254 A | 2/2000 | Neisen | 440/89 |
| 6,290,558 B1 | 9/2001 | Erickson | 440/89 |

* cited by examiner

Primary Examiner—Sherman Basinger
(74) Attorney, Agent, or Firm—William D. Lanyi

(57) ABSTRACT

An exhaust elbow for a marine propulsion system is provided with a stainless steel tube within a water outlet opening to assure that a drain opening remains open even when the exhaust elbow is exposed to a corrosive environment. Since cast iron tends to expand in volume as a result of corrosion of its surface areas, water outlet openings intended to perform a draining function can be partially or fully closed as a result of corrosion. The insertion of a stainless steel tube in one or more water outlet openings of an exhaust elbow assures that an internal water cavity of the elbow can drain when the associated internal combustion engine is turned off, thereby minimizing the possibility of freeze damage to the exhaust components.

19 Claims, 4 Drawing Sheets

MARINE EXHAUST ELBOW STRUCTURE WITH ENHANCED WATER DRAIN CAPABILITY

BACKGROUND OF THE INVENTION

1. Field of the Invention

The present invention is generally related to a marine exhaust elbow and, more particularly, to an exhaust elbow that has a tubular insert contained within its structure to enhance its capability of draining.

2. Description of the Prior Art

Many different types of exhaust elbows for use in marine propulsion systems are well known to those skilled in the art. Typically, an exhaust elbow is used in conjunction with an exhaust manifold structure to direct the flow of exhaust gases and cooling water toward the aft portion of a marine vessel for subsequent discharge overboard.

U.S. Pat. No. 6,290,558, which issued to Erickson on Sep. 18, 2001, discloses an exhaust elbow with a water trap for a marine propulsion system. The exhaust elbow for a marine propulsion exhaust system is provided with a water trap section that defines a water collection cavity. Within the water trap section, a barrier extends downward into the water collection cavity to define first and second exhaust passages. When water begins to collect in the water collection cavity, the cross sectional area of the exhaust passage is reduced and the velocity of exhaust gases passing through the exhaust passage is increased. The water collection cavity is shaped to be easily cleared when exhaust gas pressure increases as the engine speed increases.

U.S. Pat. No. 6,022,254, which issued to Neisen on Feb. 8, 2000, discloses an exhaust system for an inboard/outboard marine propulsion system. The exhaust system includes intermediate exhaust pipes which are physically separate components from the water separator. A sealed latching mechanism connects an outlet portion of the intermediate exhaust pipes to an inlet portion of the water separator. The sealed latching mechanism is secure yet flexible and allows the orientation of the intermediate exhaust pipe to be adjusted relative to the water separator, thus allowing the exhaust system to be installed and serviced without dismounting or loosening the engine. The intermediate exhaust pipes also have a flared inlet part to facilitate alignment of the intermediate exhaust pipe at the exhaust elbow.

U.S. Pat. No. 5,910,095, which issued to Strasser et al on Jun. 8, 1999, describes a fiber reinforced ceramic matrix composite marine engine riser elbow. A corrosion-resistant, thermally insulative riser elbow for a marine engine is described. The riser elbow has an exhaust gas conduit made of fiber reinforced ceramic matrix composite (FRCMC) material formed from a polymer derived ceramic resin in its ceramic state and fibers. Employing a FRCMC material results in a low-cost, light-weight, corrosion-resistant exhaust gas conduit not available with existing riser elbows. In addition, a FRCMC exhaust gas conduit is thermally insulated and so more of the heat of the exhaust is retained rather than being transferred to the conduit. This allows the cooling requirements of the riser elbow to be lowered, while still maintaining a touch temperature below prescribed levels.

U.S. Pat. No. 5,109,668, which issued to Lindstedt on May 5, 1992, discloses a marine exhaust manifold and elbow structure. The assembly includes a manifold portion, an elbow portion, a water jacket portion, and exhaust runner walls, providing a smooth continuous transition of exhaust gas flow from intake exhaust passages in the manifold portion to transfer exhaust passages in the elbow portion around a bend to a discharge exhaust passage, minimizing turbulent flow of exhaust through the manifold portion and elbow portion. Each transfer exhaust passage has its own water supply inlet at the upstream end of the respective intake exhaust passage. An upper vent includes a steam outlet opening in the water jacket at the high point of the elbow portion, and a steam exhaust channel extending along the top exterior of the water jacket portion in a raised bead above and parallel to an upper water flow passage and directing steam to the end of the discharge end passage to mix with water and exhaust thereat. Wall supports assist in directing cooling water up through the water jacket to the top of the elbow bend and also prevent wall collapse during lost foam stainless steel casting.

U.S. Pat. No. 4,991,546 which issued to Yoshimura on Feb 12, 1991, describes a cooling device for a boat engine. A number of embodiments of cooling systems for internal combustion engine powering marine watercraft are described, wherein the engine cooling jacket delivers its coolant to an exhaust manifold cooling jacket adjacent the inlet end of the exhaust manifold and wherein coolant is delivered from the exhaust manifold cooling jacket to a further cooling jacket around the inlet portion of exhaust elbow. In one embodiment, a closed cooling system is provided for the engine cooling jacket, exhaust manifold cooling jacket and the elbow cooling jacket. In another embodiment, the system discharges coolant back to the body of water in which the watercraft is operating through a further cooling jacket of the exhaust elbow that communicates with its discharge end.

U.S. Pat. No. 4,977,741, which issued to Lulloff et al on Dec. 18, 1990, discloses a combination exhaust manifold and exhaust elbow for a marine propulsion system. A combination exhaust manifold and exhaust elbow for an internal combustion engine includes an exhaust cavity for receiving exhaust from the engine, an exhaust passage leading from the exhaust cavity, and an exhaust discharge outlet. A first water jacket is provided around the exhaust cavity and a second water jacket is provided around the exhaust discharge passage. A dam is provided between the first and second water jackets, having a passage therein for allowing water communication between the first and second water jackets. A warm water inlet is provided in the first water jacket around the exhaust cavity for receiving cooling water which has been warmed by the engine, and which flow is controlled by a temperature sensitive thermostat. A cooled water inlet is provided adjacent the discharge exhaust passage. The cold water inlet is disposed either upstream or downstream of the dam adjacent the exhaust passage and allows cold bypass water to be discharged without the necessity of the cold water flowing through the entire assembly so as to prevent moisture from condensing out of the exhaust in the exhaust cavity.

U.S. Pat. No. 4,866,934, which issued to Lindstedt on Sep. 19, 1989, disclosed a marine drive exhaust system with shaped O-ring seals. The marine drive exhaust system is provided with resilient, shaped rubber O-ring seals between facing surfaces of the exhaust manifold and exhaust elbow and the facing surfaces of the exhaust elbow and the exhaust pipe. Each of the shaped O-ring seals has an inner peripheral rib extending peripherally around the exhaust passage and generally conforming to the shape thereof and being spaced laterally between the exhaust passage and the peripheral water passages. Each of the shaped O-ring seals has an outer peripheral rib extending peripherally around the water passages and spaced laterally outward of the inner rib by a gap through which the water passages extend.

U.S. Pat. No. 4,845,945, which issued to Widmer et al on Jul. 11, 1989, discloses an exhaust elbow trough. A water jacketed exhaust elbow for a marine propulsion system includes an intake exhaust passage communicating with a discharge exhaust passage, a water jacket around the exhaust passages, and a trough member extending longitudinally along a water channel along the exterior of the discharge exhaust passage to guide water therealong to mix with exhaust at the end of the discharge exhaust passage. The trough member extends beyond the end tip of the discharge exhaust passage and has a sharp edge providing a clean parting surface for the cooling water and preventing ingestion of water back into the discharge exhaust passage.

U.S. Pat. No. 4,573,318, which issued to Entringer et al on Mar. 4, 1986, discloses an exhaust elbow for a marine propulsion system. The marine propulsion system is provided with an exhaust elbow having an intake exhaust passage extending upwardly from the engine and communicating through a bend with a discharge exhaust passage, a water jacket having pockets around the exhaust no passage for cooling the latter. A central channel extends longitudinally along the exterior of the exhaust passages to guide water therealong to the end of the discharge exhaust passage to mix with exhaust thereat. The central channel has a pair of side walls extending longitudinally and laterally tapered away from each other at the outer end of the discharge exhaust passage to create an outward draw as from the central channel to minimize break-up of longitudinally outward water flow and maintain the end tip of the discharge exhaust passage dry and prevent water ingestion and creeping back into the discharge exhaust passage due to pulsations of the engine. Dam and port structure is also provided enabling faster heating of the exhaust passage and in turn minimizing condensation within the elbow which may otherwise ingest back into the engine.

U.S. Pat. No. 5,174,252, which issued to Binversie et al on Dec. 29, 1992, describes an exhaust manifold expansion slot for an internal combustion motor. A multiple cylinder internal combustion cylinder block having a cast exhaust manifold means integrally cast with the block is disclosed. The manifold means includes manifold port portions that communicate with the cylinder bores, and an expansion slot is provided in the manifold port portions adjacent the cylindrical bores to relieve stress which tends to distort the cylindrical bores of the block.

U.S. Pat. No. 5,018,568, which issued to VanRens on May 28, 1991, describes a lost form engine block pattern. The engine block pattern for an engine block includes a cylinder and an axially extending transfer passage defined by spaced side walls and an inner wall which is outwardly convex. The pattern further includes a first pattern piece including a wall defining a portion of a cylindrical bore having an axis, and a passage recess extending in the direction of the axis of the cylindrical bore and communicating with the cylindrical bore, which so passage recess is defined by opposing walls extending axially with respect to the cylindrical bore and forming the spaced side walls of the transfer passage, a second pattern piece located in the passage recess, having a first arcuate wall forming a continuation of the cylinder bore portion of the first pattern piece, having a second arcuate wall forming the inner wall of the transfer passage and being outwardly convex and additional recesses and portions on the first and second pattern pieces for locating the pattern pieces relative to each other and preventing relative movement therebetween except in the direction opposite the direction of assembly of the pattern pieces.

The patents described above are hereby expressly incorporated by reference in the description of the present invention.

Many different types of exhaust elbows are known to those skilled in the art. In addition, the process of lost foam casting is well known to those skilled in the art. Furthermore, lost form casting techniques which incorporate inserts in the lost foam pattern prior to casting the primary metal structure are known.

Since many exhaust elbows are made of cast iron material, it would be significantly beneficial if a means could be provided to prevent the decrease in cross sectional area of drain openings which are intended to allow cooling water to drain from engine components when the internal combustion engine is not in operation. This decrease in drain area can be caused by corrosion.

SUMMARY OF THE INVENTION

An exhaust gas conducting system for a marine propulsion system made in accordance with the present invention comprises an exhaust conducting structure made of a first material and an exhaust gas cavity formed within the exhaust conducting structure. The exhaust, gas cavity has an exhaust inlet opening and an exhaust outlet opening. A water cavity is formed within the exhaust conducting structure and is disposed in thermal communication with the exhaust gas cavity. The water cavity has a water inlet opening and a water outlet opening. A tube is disposed within the water outlet opening and in fluid communication with the water cavity. The tube is made of a second material. The first material is different than the second material.

In a particularly preferred embodiment of the present invention, the first material is cast iron and the second material is a stainless steel alloy. In certain embodiments of the present invention, a supplemental tube is also disposed within the water outlet opening and in fluid communication with the water cavity. The supplemental tube is made of the second material.

In a preferred embodiment of the present invention, the exhaust conducting structure is an exhaust elbow and the tube is cast into the exhaust conducting structure, as an insert, during the lost foam casting process. The tube is cast into the exhaust conducting structure at a time when the first material is molten in a preferred embodiment of the present invention.

The water cavity surrounds the exhaust gas cavity within at least a portion of the exhaust conducting structure in one embodiment. The water cavity can conduct either salt water or fresh water in thermal communication with the exhaust gas cavity and the second material can be UNS S31600 stainless steel.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
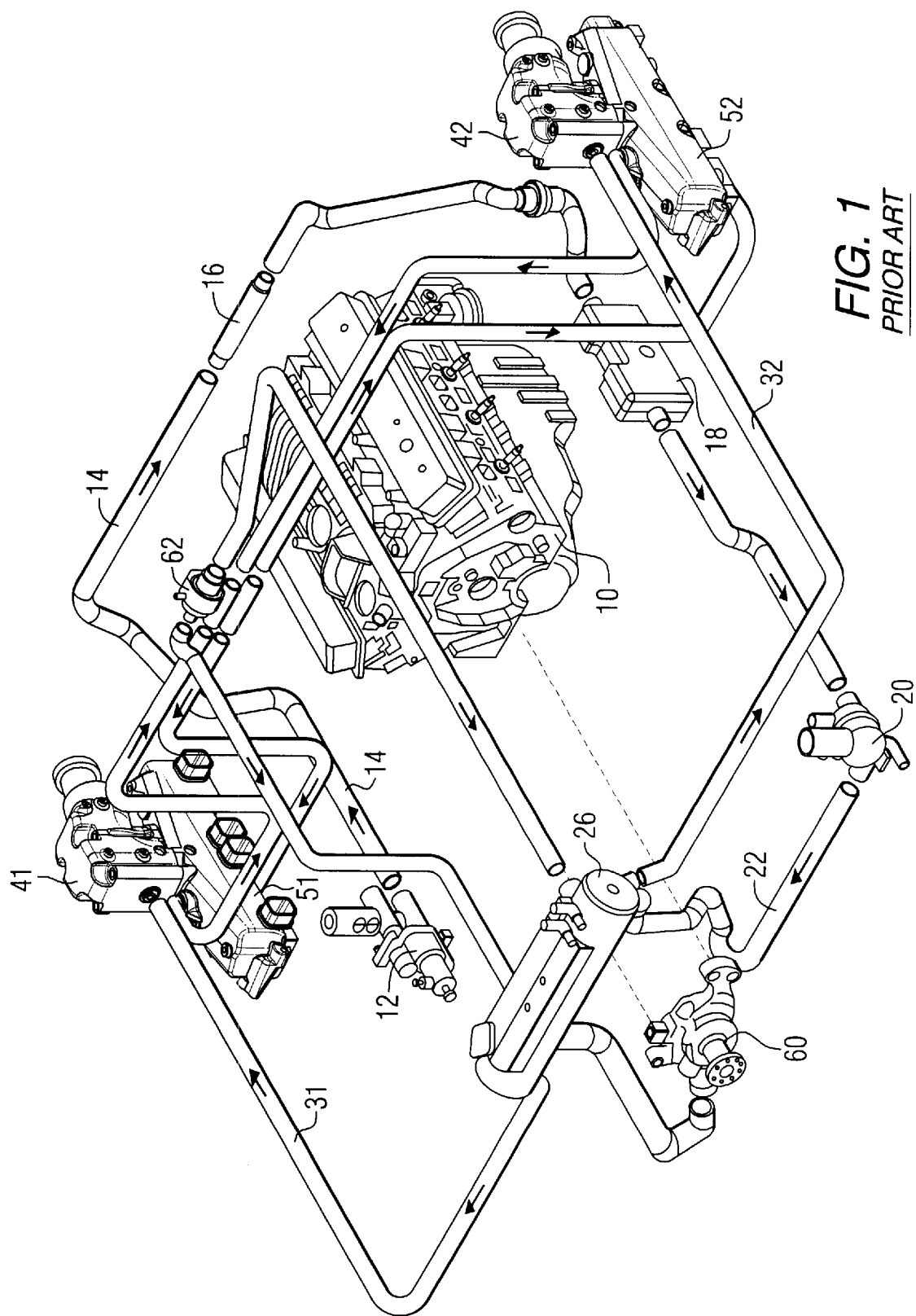
FIG. 1 is an exploded isometric view of a closed cooling system for a marine propulsion system.

Throughout the description of the preferred embodiment of the present invention, like components will be identified by like reference numerals.

FIG. 1 is an isometric exploded view of a cooling system of an internal combustion engine. The particular cooling system illustrated in FIG. 1 is referred to as a "closed cooling system" because it uses a primary coolant, such as an ethylene glycol and water mixture, to remove heat from the engine and other heat producing components and it uses a secondary fluid, such as lake or sea water, to remove heat from the primary cooling fluid. As will be described in greater detail below, the present invention is particularly applicable to a closed cooling system of this type. The engine 10 is provided with a water pump that causes water, drawn from the body of water in which the marine propulsion system is operating, to flow through the conduit identified by reference numeral 14. This causes the water to flow in thermal communication with transmission fluid within a transmission cooler 16, The water then flows through a fuel cooler 18, through a water manifold structure 20, through conduit 22, and into a heat exchanger 26. From the heat exchanger 26, the water then flows through conduits 31 and 32 to the exhaust elbows, 41 and 42. The two exhaust elbows, 41 and 42, are associated with exhaust manifolds, 51 and 52, respectively. A circulation pump 60 directs the primary coolant, such as an ethylene glycol and water mixture, through the heat exchanger 26 and, in cooperation with a thermostat housing 62, through the cooling passages of the engine block and exhaust manifolds, 51 and 52. The present invention is particularly related to an improvement of the exhaust elbows, 41 and 42.

Figure 2:
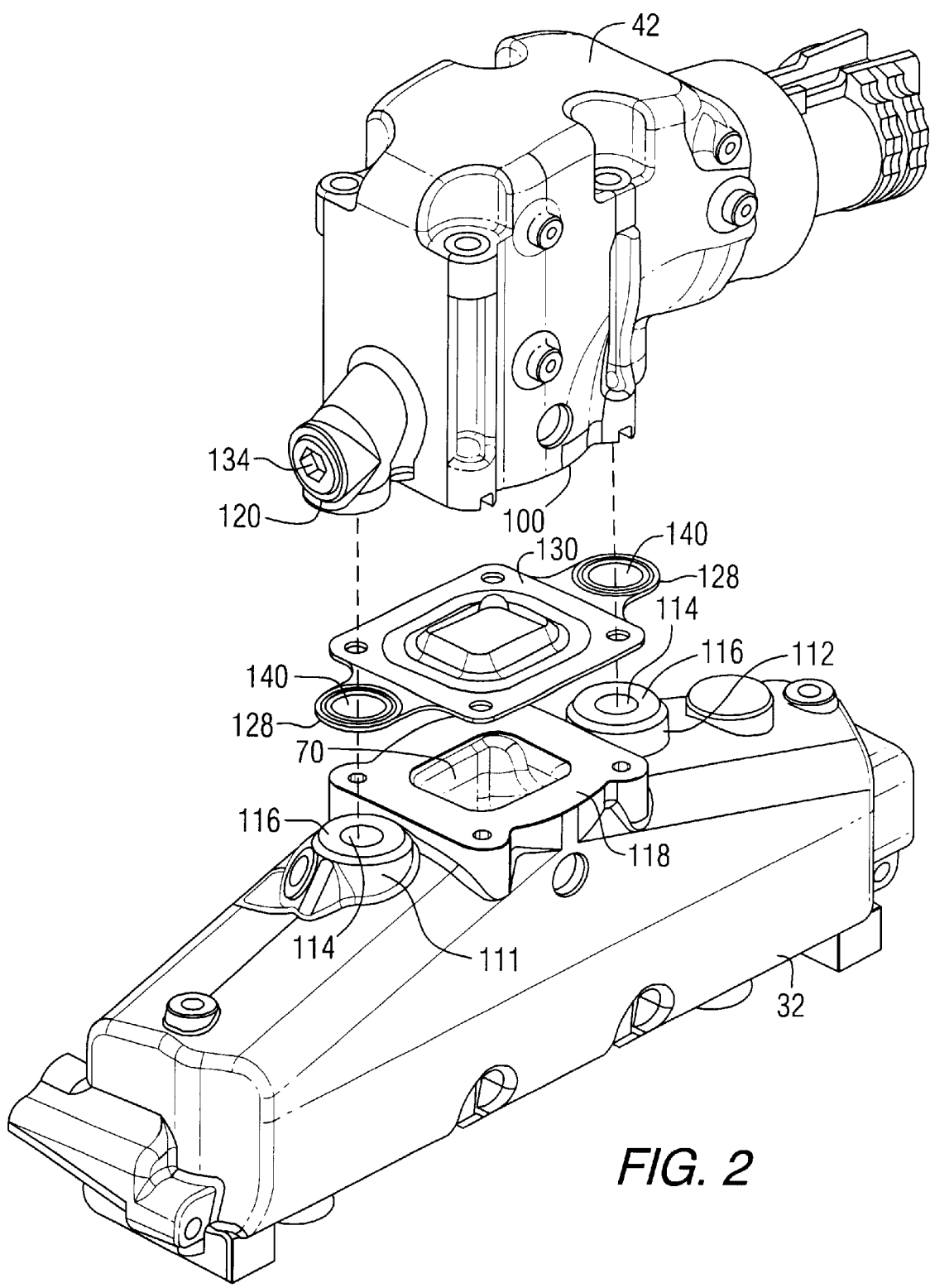
FIG. 2 is an exploded isometric view of one particular type of exhaust manifold and exhaust elbow.

FIG. 2 is an exploded isometric view of an exhaust manifold 52 and an associated exhaust elbow 42. In the particular exhaust system shown in FIG. 2, exhaust gases flow through the exhaust manifold 52 and exit, in an upward direction, through exhaust opening 70. These exhaust gases continue in an upward direction and enter an exhaust inlet opening 100 formed in a surface at the underside of the exhaust elbow 42. Although the exhaust inlet opening 100 is not illustrated in detail in FIG. 2, it will be described and illustrated in greater detail below.

With continued reference to FIG. 2, the exhaust manifold 52 is provided with individual water conducting structures, 111 and 112, which conduct water upwardly through openings 114 formed in surfaces 116 as illustrated in FIG. 2. The exhaust conduit 70 of the exhaust manifold 52 is formed through surface 118. The exhaust elbow 42 is provided with a water conduit 120 on opposite sides of its structure. The water conduit 120 can be used in two ways. In some systems, which do not employ a closed cooling system, water flows upward through openings 114 and through the extension portions 128 of gasket 130 to enter the water conduits 120 of the exhaust elbow 42. However, in a closed cooling system, water is introduced through the opening 134 which is shown with a plug inserted in it in FIG. 2. In a closed cooling system, the portions of the gasket 130 identified by reference numerals 140 are solid and do not allow water to flow upwardly from openings 114. In closed cooling systems, the primary coolant, such as an ethylene glycol and water mixture, is used to cool the exhaust manifold 52 and sea or lake water is introduced into openings 134 to cool the exhaust elbow 42 and downstream conduits. As will be described in greater detail below, the present invention is primarily intended for use in closed cooling systems in which portions 140 of the gasket 130 are solid portions of the gasket plate that block openings 114.

Figure 3:
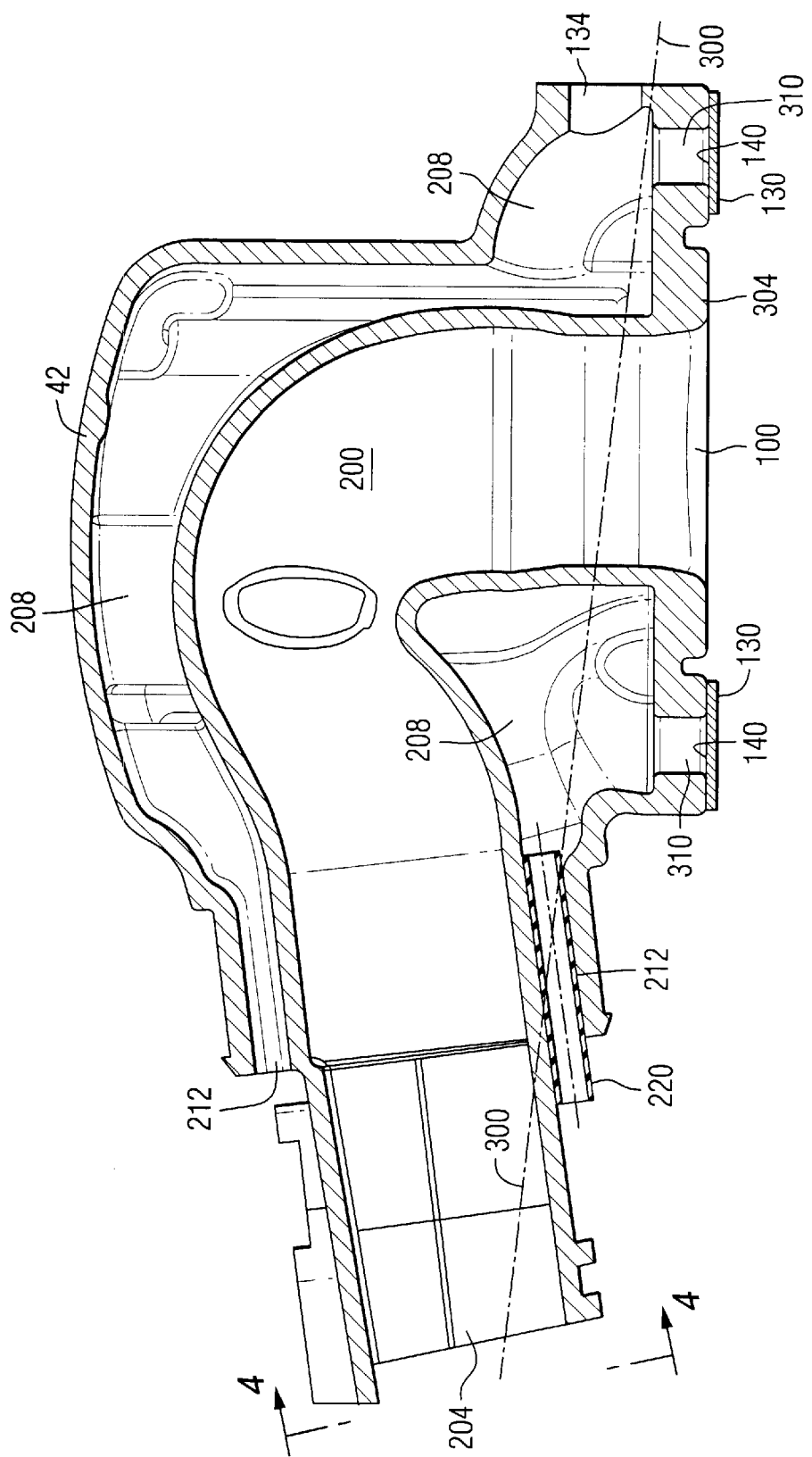
FIG. 3 is a section view of an exhaust elbow incorporating the concepts of the present invention.

FIG. 3 shows an exhaust elbow 42 made in accordance with the present invention. The exhaust elbow 42 serves as an exhaust conducting structure and is made of a first material. The first material, in a preferred embodiment of the present invention, is cast iron. An exhaust gas cavity 200 is formed within the exhaust conduction structure of the exhaust conducting system for a marine propulsion system and has an exhaust inlet opening 100 and an exhaust outlet opening 204. A water cavity 208 is formed within the exhaust conducting structure and is disposed in thermal communication with the exhaust gas cavity 200. Heat flows from the exhaust gas cavity 200 toward the water cavity 208. The water cavity 208 has at least one water inlet opening 134 and at least one water outlet opening, 212. One or more tubes 220 is disposed within the water outlet opening 212 and in fluid communication with the water cavity 208. The tube 220 is made of a second material. The first and second-materials are different from each other. In a preferred embodiment of the present invention, the second material is a stainless steel alloy, such as the alloy identified as UNS S31600. This alloy is also referred to as a type 316 stainless steel. As will be described below, a preferred embodiment of the present invention has two tubes 220 disposed within the water outlet 212 of the exhaust conducting structure such as the exhaust manifold 42 illustrated in FIG. 3.

With continued reference to FIG. 3, the tube 220 is cast into the exhaust conducting structure when the manifold 42 is formed through a casting process such as a lost foam casting procedure. This is accomplished by initially inserting the tubes 220 into a foam model, surrounding the tube 220 and the foam model with an appropriate sand material, and then pouring molten cast iron into the sand structure to evaporate the foam model while filling the space previously contained by the foam model. The cast iron surrounds and encapsulates portions of the tubes 220 to form a permanent structure combining the cast iron elbow 42 and the stainless steel tube 220. The tube is mechanically retained due to the molten iron shrinking on to the tube during the cooling process. As a result, a press fit is created due to the shrinking of the iron. The lost foam casting process is well known and won't be further described herein.

To further illustrate the potential problem to which the present invention is provided as a solution, line 300 is used to represent a horizontal line after the exhaust elbow 42 is attached to an exhaust manifold 52 such as the exhaust manifolds described above in conjunction with FIGS. 1 and 2. It can be seen that the horizontal line 300 is not parallel to the face 304 of the undersurface of the elbow 42 or to the gasket 130 of which only a portion is illustrated in FIG. 3. The gasket 130 is shown with the portions identified by reference numeral 140 and described above in conjunction with FIG. 2. These portions 140 block the openings of the elbow 42 identified by reference numeral 310 in FIG. 3. In an open cooling system, where cooling water is used to remove heat from both the exhaust manifold 52 and the exhaust elbow 42, openings 310 would normally allow water to drain from the water cavity 208 when the associated engine 10 is not being operated. However, since a primary coolant such as an ethylene glycol and water mixture is used in a closed system to remove heat from the exhaust manifold 52, and lake or sea water is used in water cavity 208 to cool the exhaust elbow 42, openings. 310 must be blocked by the closed portions 140 of the gasket 130. As a.result of the blockage of openings 310 and as a further result of the angular disposition between surface 304 and the horizontal line 300, water can be trapped in the portion of the water cavity 208 that is most proximate the water outlet opening 212.

With continued reference to FIG. 3, it can be seen that if the exhaust elbow 42 is installed in a application that places surface 304 in a generally parallel association with a horizontal line 300, water can almost completely drain from the water cavity 208 through opening 134. However, when installed at an angle between surface 304 and a horizontal line 300, as shown in FIG. 3 water can be trapped in certain portions of the water cavity 208. The water outlet opening 212 is provided for these purposes so that water can drain from the water cavity 208. If this water is not drained prior to freezing temperatures occurring, freeze damage of the exhaust elbow will be caused and the engine will be rendered inoperable. However, as is well known to those skilled in the art, cast iron has a tendency to corrode, particularly when used in conjunction with sea water as the secondary coolant. If the lower water outlet openings 212 become corroded, their effective cross sectional openings can be significantly decreased. In certain circumstances, the corrosion within the inside of the water outlet opening 212 is sufficient to effectively close some of these openings. When that occurs, water can be trapped in the lower portions of the water cavity 208 that are most proximate to the water outlet openings 212. By providing a stainless steel tube 220 within the lower water outlet openings 212 of the elbow 42, an open drain is assured through the water outlet openings 212. Type 316 stainless steel is more noble than cast iron and is less prone to corrosion deterioration.

Figure 4:
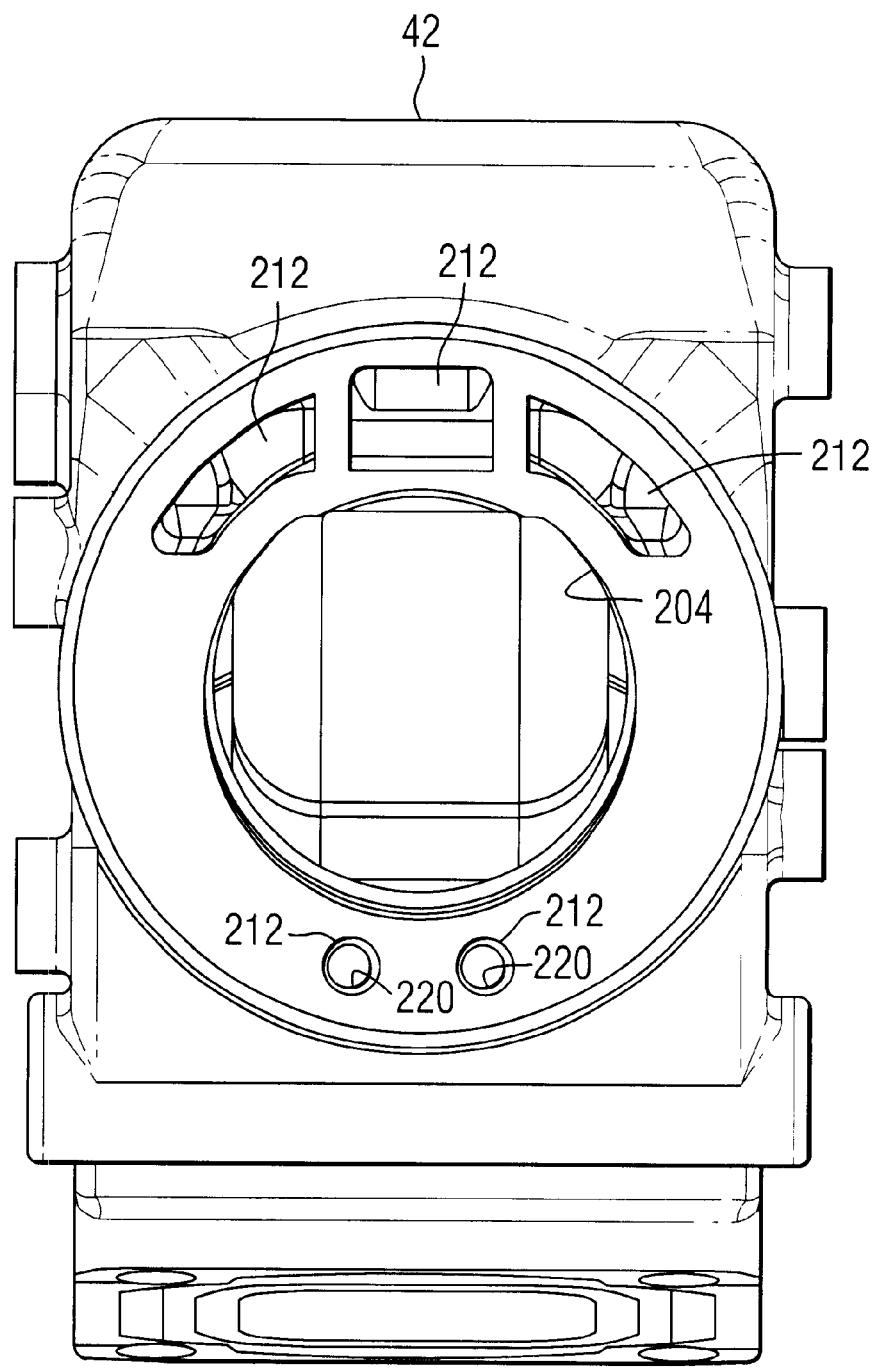
FIG. 4 is a end view showing the exhaust outlet opening and water outlet openings of the exhaust elbow shown in FIG. 3.

FIG. 4 is an end view of the elbow 42 shown in FIG. 3. In the end view shown in FIG. 4, the exhaust outlet opening 204 is shown with three water outlet openings 212 above it and two water outlet openings 212 below it. In the two lower water outlet openings, the tubes 220 are shown in place. As described above, the tubes 220 are cast in place during the lost foam casting process with which the elbow 42 is manufactured. This results in a permanent partial encapsulation of the tubes 220 within the cast iron structure of the exhaust elbow 42. The material used to manufacture the tube 220 is stainless steel and, therefore, the tubes 220 are not subject to corrosion to the same degree as the cast iron material of the elbow 42. As a result, the two lower water outlet openings 212 are assured to be open when needed to drain water from the water cavity 208. Two drain openings are beneficial since one may become blocked due to cast iron corrosion flaking off of another region of the structure and having two tubes significantly decreases the likelihood of this happening.

With reference to FIGS. 3 and 4, the exhaust gas conducting system for a marine propulsion system made in accordance with the present invention comprises an exhaust conducting structure, such as the exhaust elbow 42, made of a first material such as cast iron. An exhaust gas cavity 200 is formed within the exhaust conducting structure and is provided with an exhaust inlet opening 100 and an exhaust outlet opening 204. A water cavity 208 is formed within the exhaust conducting structure and is disposed in thermal communication with the exhaust gas cavity 200. The water cavity 208 has a water inlet opening 134 and a water outlet opening 212. The water outlet opening 212 can actually comprise a plurality of openings as illustrated in FIG. 4. A tube 220 is disposed within the water outlet opening 212 and in fluid communication with the water cavity 208. The tube is made of a second material, such as stainless steel. In a preferred embodiment, the exhaust elbow 42 is made of cast iron and the tube 220 is made of a stainless steel alloy. In certain embodiments of the present invention, a plurality of tubes 220 are disposed within the water outlet openings 212 of an exhaust elbow 42.

Although the tube 220 can be made of other materials, a particularly preferred embodiment of the present invention uses a type 316 (UNS S31600) stainless steel. This type of stainless steel is a molybdenum-containing austenitic stainless steel that is intended to provide improved corrosion resistance relative to other types of stainless steel. This type of stainless steel is intended for use in moderately corrosive process environment and is non-magnetic in the annealed condition. The addition of molybdenum provides improved resistance to pitting and crevice corrosion in environments containing chlorides and other halides. The stainless steel tube 220 provides a significantly better corrosion resistance characteristic than the cast iron material used to make the predominant portions of the exhaust elbow 42. Therefore, in circumstances where corrosion is expected in the water outlet openings 212, the stainless steel tube 220 assures that the associated water outlet openings remain open to allow water to drain from the water cavity 208, thereby preventing freeze damage. Subsequent coatings, such as aluminum oxide ceramic and/or epoxy may still be applied to the composite exhaust elbow structure of the present invention. These coatings provide a barrier layer that minimizes the amount of seawater that can otherwise attack the cast iron surface. As a result, corrosion deterioration of the exhaust elbow structure is further minimized.

Although the present invention has been described in considerable detail and illustrated to show a particularly preferred embodiment, it should be understood that alternative embodiments are also within its scope.

We claim:

1. An exhaust gas conducting system for a marine propulsion system, comprising:

an exhaust conducting structure made of a first material;

an exhaust gas cavity formed within said exhaust conducting structure of said exhaust gas conducting system, said exhaust gas cavity having an exhaust inlet opening and an exhaust outlet opening;

a water cavity formed within said exhaust conducting structure, said water cavity being disposed in thermal communication with said exhaust gas cavity, said water cavity having a water inlet opening and a water outlet opening; and a tube disposed within said water outlet opening and in fluid communication with said water cavity, said tube being made of a second material, said first material being different than said second material, said exhaust conducting structure being an exhaust elbow.

2. The exhaust gas conducting system of claim 1, wherein:

said first material is cast iron and said second material is a stainless steel alloy.

3. The exhaust gas conducting system of claim 1, further comprising:

a supplemental tube disposed within said water outlet opening and in fluid communication with said water cavity, said supplemental tube being made of said second material.

4. The exhaust gas conducting system of claim 1, wherein:

said tube is cast into said exhaust conducting structure.

5. The exhaust gas conducting system of claim 4, wherein:

said tube is cast into said exhaust conducting structure when said first material is molten.

6. The exhaust gas conducting system of claim 1, wherein:

said water cavity surrounds said exhaust gas cavity within at least a portion of said exhaust conducting structure.

7. The exhaust gas conducting system of claim 1, wherein:

said water cavity conducts salt water in thermal communication with said exhaust gas cavity.

8. The exhaust gas conducting system of claim 1, wherein:

said second material is UNS S31600 stainless steel.

9. An exhaust gas conducting system for a marine propulsion system, comprising:

an exhaust elbow made of a first material;

an exhaust gas cavity formed within said exhaust elbow of said exhaust gas conducting system, said exhaust gas cavity having an exhaust inlet opening and an exhaust outlet opening;

a water cavity formed within said exhaust elbow, said water cavity being disposed in thermal communication with said exhaust gas cavity, said water cavity having a water inlet opening and a water outlet opening; and a first tube disposed within said water outlet opening and in fluid communication with said water cavity, said first tube being made of a second material, said first material being different than said second material.

10. The exhaust gas conducting system of claim 9, wherein:

said first material is cast iron and said second material is a stainless steel alloy.

11. The exhaust gas conducting system of claim 10, further comprising:

a second tube disposed within said water outlet opening and in fluid communication with said water cavity, said second tube being made of said second material.

12. The exhaust gas conducting system of claim 11, wherein:

said first tube is encapsulated within said exhaust elbow.

13. The exhaust gas conducting system of claim 12, wherein:

said first tube is cast into said exhaust elbow when said first material is molten.

14. The exhaust gas conducting system of claim 13, wherein:

said water cavity surrounds said exhaust gas cavity within at least a portion of said exhaust elbow.

15. The exhaust gas conducting system of claim 14, wherein:

said second material is UNS S31600 stainless steel.

16. An exhaust gas conducting system for a marine propulsion system, comprising:

an exhaust elbow made of a first material;

an exhaust gas cavity formed within said exhaust elbow of said exhaust gas conducting system, said exhaust gas cavity having an exhaust inlet opening and an exhaust outlet opening;

a water cavity formed within said exhaust elbow, said water cavity being disposed in thermal communication with said exhaust gas cavity, said water cavity having a water inlet opening and a water outlet opening;

a first tube disposed within said water outlet opening and in fluid communication with said water cavity, said first tube being made of a second material; and a second tube disposed within said water outlet opening and in fluid communication with said water cavity, said second tube being made of said second material, said first material being different than said second material.

17. The exhaust gas conducting system of claim 16, wherein:

said first material is: cast iron and said second material is a stainless steel alloy.

18. The exhaust gas conducting system of claim 17, wherein:

said first tube is cast into said exhaust elbow when said first material is molten.

19. The exhaust gas conducting system of claim 18, wherein:

said water cavity surrounds said exhaust gas cavity within at least a portion of said exhaust elbow.

\* \* \* \* \*